(12) United States Patent
Maloche et al.

(10) Patent No.: US 7,610,261 B2
(45) Date of Patent: *Oct. 27, 2009

(54) SYSTEM AND METHOD FOR ACQUISITION, ASSIMILATION AND STORAGE OF INFORMATION

(75) Inventors: Donald M Maloche, Fort Lauderdale, FL (US); Rao S Manepalli, Weston, FL (US); Randy Mills, Wellington, FL (US); Ana Muniz, Pembroke Pines, FL (US); Mark Rutter, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,348

(22) Filed: Oct. 31, 2007

(65) Prior Publication Data

US 2008/0065651 A1    Mar. 13, 2008

Related U.S. Application Data

(63) Continuation of application No. 10/160,583, filed on May 31, 2002, now Pat. No. 7,386,528.

(51) Int. Cl.
*G06F 17/30* (2006.01)
(52) U.S. Cl. .................. 707/1; 707/10; 707/102
(58) Field of Classification Search ............ 707/1–6, 707/7, 9–10, 102; 705/40
See application file for complete search history.

(56) References Cited

U.S. PATENT DOCUMENTS

| | | | |
|---|---|---|---|
| 5,274,547 A | 12/1993 | Zoffel et al. | |
| 5,696,907 A | 12/1997 | Tom | |
| 5,761,662 A | 6/1998 | Dasan | |
| 5,774,882 A | 6/1998 | Keen et al. | |
| 5,864,827 A | 1/1999 | Wilson | |
| 5,870,721 A | 2/1999 | Norris | |
| 5,878,403 A | 3/1999 | DeFrancesco et al. | |
| 5,884,310 A | 3/1999 | Brichta et al. | |
| 5,913,214 A | 6/1999 | Madnick et al. | |
| 5,933,837 A | 8/1999 | Kung | |

(Continued)

FOREIGN PATENT DOCUMENTS

WO    WO 01/22310    3/2001

(Continued)

*Primary Examiner*—Debbie M Le
(74) *Attorney, Agent, or Firm*—Snell & Wilmer L.L.P.

(57) ABSTRACT

In accordance with the present invention, an improved data handling system facilitates the collection, storage and distribution of information for use by one or more recipient performing a process such as assessing the risk associated with a transaction. A system for handling information includes an administrator for facilitating communication with a subscriber and an information acquisition engine that is for facilitating communication with one or more provider of information and an information assimilator that is for facilitating communication with a database. The system is configured to facilitate receiving a request from the subscriber defining one or more set of information and one or more provider of information to be received by the information acquisition engine and combined by the information assimilator into an information suite to be stored in a database.

16 Claims, 2 Drawing Sheets

U.S. PATENT DOCUMENTS

| | | | |
|---|---|---|---|
| 6,023,694 | A | 2/2000 | Kouchi et al. |
| 6,029,149 | A | 2/2000 | Dykstra et al. |
| 6,029,154 | A | 2/2000 | Pettitt |
| 6,078,924 | A | 6/2000 | Ainsbury et al. |
| 6,088,686 | A | 7/2000 | Walker et al. |
| 6,094,643 | A | 7/2000 | Anderson et al. |
| 6,119,103 | A | 9/2000 | Basch |
| 6,119,106 | A | 9/2000 | Mersky et al. |
| 6,151,601 | A | 11/2000 | Papierniak et al. |
| 6,202,053 | B1 | 3/2001 | Christiansen et al. |
| 6,260,059 | B1 | 7/2001 | Uemo et al. |
| 6,269,365 | B1 | 7/2001 | Kiyoki et al. |
| 6,289,319 | B1 | 9/2001 | Lockwood |
| 6,311,169 | B2 | 10/2001 | Duhon |
| 6,324,524 | B1 | 11/2001 | Lent et al. |
| 6,405,181 | B2 | 6/2002 | Lent et al. |
| 6,594,647 | B1 * | 7/2003 | Randle et al. .................. 705/77 |
| 6,658,393 | B1 | 12/2003 | Basch et al. |
| 6,732,181 | B2 | 5/2004 | Lim et al. |
| 6,811,077 | B2 * | 11/2004 | Durand et al. ............... 235/379 |
| 6,947,902 | B2 * | 9/2005 | Shah et al. .................... 705/26 |
| 6,988,085 | B2 | 1/2006 | Hedy |
| 7,359,880 | B2 * | 4/2008 | Abel et al. .................... 705/39 |
| 2001/0011245 | A1 | 8/2001 | Duhon |
| 2001/0011246 | A1 | 8/2001 | Tammaro |
| 2001/0014877 | A1 | 8/2001 | DeFrancesco, Jr. et al. |
| 2001/0018674 | A1 | 8/2001 | Schein et al. |
| 2001/0032178 | A1 | 10/2001 | Adams et al. |
| 2001/0037289 | A1 | 11/2001 | Mayr et al. |
| 2001/0037348 | A1 | 11/2001 | Nakada et al. |
| 2001/0054022 | A1 | 12/2001 | Louie et al. |
| 2001/0056475 | A1 | 12/2001 | Anderson et al. |
| 2002/0007341 | A1 | 1/2002 | Lent et al. |
| 2002/0019788 | A1 | 2/2002 | Stehle et al. |
| 2002/0029188 | A1 | 3/2002 | Schmid |
| 2002/0049738 | A1 | 4/2002 | Epstein |
| 2002/0095399 | A1 | 7/2002 | Devine et al. |
| 2002/0120685 | A1 | 8/2002 | Srivastava et al. |
| 2002/0174000 | A1 | 11/2002 | Katz et al. |
| 2003/0009418 | A1 | 1/2003 | Green et al. |
| 2003/0074401 | A1 | 4/2003 | Connell et al. |
| 2003/0093366 | A1 | 5/2003 | Halper et al. |
| 2004/0088318 | A1 | 5/2004 | Brady |
| 2004/0236673 | A1 | 11/2004 | Eder |
| 2005/0093881 | A1 | 5/2005 | Okita et al. |
| 2005/0154664 | A1 | 7/2005 | Guy et al. |

FOREIGN PATENT DOCUMENTS

| | | |
|---|---|---|
| WO | WO 01/86497 | 11/2001 |
| WO | WO 02/07009 | 1/2002 |

* cited by examiner

SYSTEM AND METHOD FOR ACQUISITION, ASSIMILATION AND STORAGE OF INFORMATION

CROSS-REFERENCE TO RELATED APPLICATIONS

This application is a continuation of U.S. Ser. No. 10/160,583 filed on May 31, 2002 entitled "SYSTEM AND METHOD FOR ACQUISITION, ASSIMILATION AND STORAGE OF INFORMATION", which application is incorporated herein by reference.

FIELD OF THE INVENTION

The present invention relates generally to facilitating the collection, storage and distribution of information, and more specifically, to systems and methods for defining the source of the information, collecting information from external and internal sources and distributing the information to a recipient for assessing the risk associated with a transaction.

BACKGROUND OF THE INVENTION

In the field of automated information processing, many applications have been developed to process information for useful purposes such as making a decision or evaluating a set of information based on one or more criteria. In many cases, the speed, accuracy, and reliability of these applications are often limited only by their abilities to reliably acquire information. As these applications are developed, they are typically designed to utilize, and/or rely upon, a specific set of information, and that information set is usually defined in accordance with the information that is reasonably accessible, or envisioned soon to be reasonably accessible, at the time when the application is devised and/or expected to be implemented. As the set of reasonably accessible information subsequently changes (e.g., new information becomes available or other information becomes unavailable), applications are often re-configured to function without the once-available information, or alternatively, to take advantage of the newly available information. In this way, applications that are not updated often become obsolete.

One example of an application that has been designed to process information is an application for determining the risk associated with a transaction. Many lenders have devised customized methods for determining risk associated with a transaction, and have developed applications to perform a transaction risk and/or creditworthiness assessment, i.e., to determine an applicant's credit score. As a practical matter, however, these applications are often limited to information that can be acquired reasonably quickly through reliable sources such as credit bureaus or the credit issuer's internal database. Although a lender may attempt to increase the accuracy and/or reliability of their credit-scoring model by accommodating additional information, such as recent transaction history, such attempts typically increase the time and cost required to complete a transaction risk and/or creditworthiness assessment. This is due to the increased time and effort required to acquire the additional information. Moreover, where additional information becomes available through a standard database provider, a lender must modify existing models to accommodate the additional information, resulting in increased cost.

Accordingly, a need exists for a system and method for facilitating the collection, storage and distribution of information, where a subscriber may easily configure the source of the information. Moreover, a need exists for a system and method for facilitating the collection, storage and distribution of information, where a subscriber may easily configure the definition of the information set.

SUMMARY OF THE INVENTION

The methods and systems of the present invention address many of the shortcomings of the prior art. In accordance with various aspects of the present invention, improved systems and methods are provided to facilitate the collection, storage and distribution of information for use by one or more application, such as a model for assessing the risk associated with a transaction.

In accordance with one aspect of the present invention, a system for handling information 100 includes an administrator 130 for facilitating communication with both a subscriber 110 and an information acquisition engine 140. The administrator 130 is configured to facilitate receiving a request from the subscriber 110 to acquire one or more prescribed sets of information 160 from one or more selected providers 150, i.e., internal 155 and/or external 152 sources, of information. In addition, the administrator 130 is configured to facilitate instructing the information acquisition engine 140 to retrieve the information 160 from the selected providers 150 and to facilitate communication of the information 160 to an information assimilator 170. The information assimilator 170 is configured to facilitate receiving the information 160 from the information acquisition engine 140, to facilitate combining the information 160 into an information suite 176, and to facilitate storing the information suite 176 in a database 178. Finally, the administrator 130 may be configured to facilitate informing the subscriber 110 whether and when the requested information 160 has been collected and where and/or how it may be accessed. Optionally, the administrator 130 may be configured to facilitate communicating a request to the information assimilator 170 to transmit the information suite 176 to a designated information recipient 180. In such embodiments, the information assimilator 170 is configured to facilitate communication with the information recipient 180 so that the information suite 176 may be transmitted.

The request 120 from the subscriber 110 is configured to facilitate flexibly modifying the definition of the information to be collected 122 and/or the identity of the information provider 124. In accordance with another exemplary embodiment of the present invention, the information acquisition engine 140 may additionally be configured to facilitate acquiring information 165 from an internal database 155 to be combined with whatever external information 162, if any, was received by, or whose receipt was facilitated by, the information acquisition engine 140. In accordance with yet another exemplary embodiment of the present invention, the information suite 176 may be configured to facilitate processing by the recipient 180 or its delegate in order to determine the risk associated with a transaction.

In accordance with another aspect of the invention, a method of handling information 200 is initiated when an administrator 130 receives a request 122 from a subscriber 110 to acquire one or more prescribed sets of information 160 from one or more selected providers 150, i.e., internal 155 and/or external 152 sources, of information (step 210). In response to the request 120, the administrator 130 facilitates the request by implementing the identity 124 of the information provider 150 and the definition 122 of the requested information 160 (step 220) and communicates conforming instructions to an information acquisition engine 140 (step 230). In accordance with those instructions 120, the information acquisition engine 140 facilitates receipt of the requested information 160 from the selected provider 150 (step 240) and facilitates communicating the information 160 to an information assimilator 170 (step 250). The information assimilator 170 facilitates receiving the information from the information acquisition engine 140 (step 260), facilitates combining the information into an information suite 176 (step 270), and facilitates storing the information suite 176 in a database 178 (step 280). Finally, the administrator 130 facilitates informing the subscriber 110 whether and when the requested information 160 has been collected and where and how it may be accessed (step 290). Optionally, the system facilitates transmitting the information suite 176 to a designated information recipient or its delegate 180 (step 291).

In accordance with an exemplary embodiment of the present invention, the definition 122 of the information to be collected 160 and/or the identity 124 of the information provider 150 are stored in a standard request module 120 configured to be accessed for repetitive use. The standard request module 120 may be configured to facilitate modification in accordance with the desires of a subscriber 110, which may be desirable as information requirements or providers change. In accordance with another exemplary embodiment of the present invention, the information acquisition engine 140 may additionally facilitate acquiring information 165 from an internal database 155 to be combined with the external information 162, as facilitated by the information assimilator 170. In accordance with yet another exemplary embodiment of the present invention, the information suite 176 may be processed by the recipient 180 or its delegate in order to determine the risk associated with a transaction, which in turn may depend upon several factors such as fraud risk, economic risk, or the risk associated with a transaction.

BRIEF DESCRIPTION OF THE DRAWINGS

The above-mentioned objects and features of the present invention can be more clearly understood from the following detailed description considered in conjunction with the following drawings, in which like numerals represent like elements and in which.

DETAILED DESCRIPTION

Figure 1:
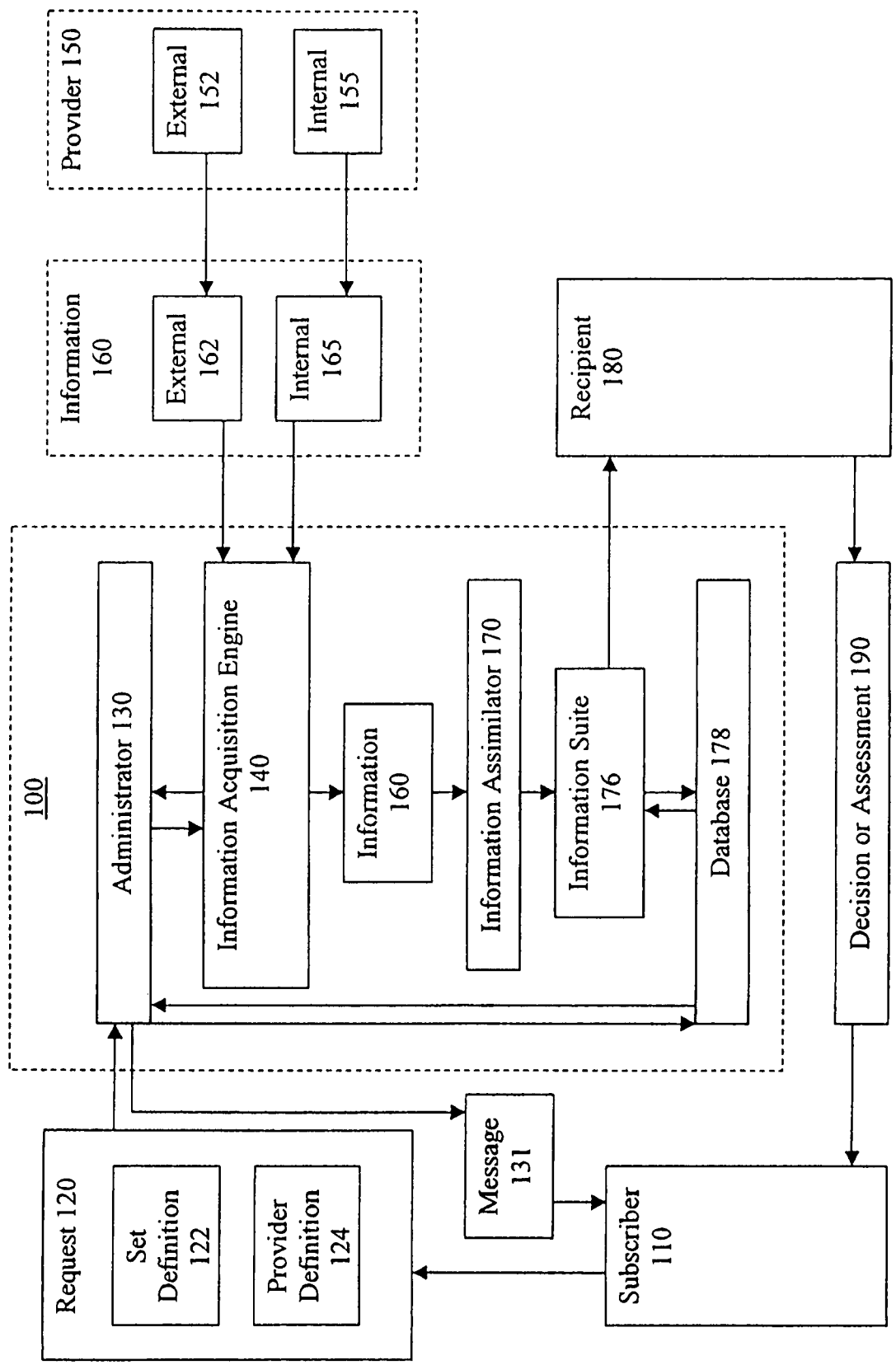
FIG. 1 illustrates the components of an exemplary information handling system; and, FIG. 2 illustrates an exemplary process for facilitating an information handling process.

The present invention is an improved system and method for facilitating the collection, storage and distribution of information for use by one or more application. In accordance with one aspect of the present invention, a system for handling information 100 includes an administrator 130 for facilitating communication with both a subscriber 110 and an information acquisition engine 140. The administrator 130 is configured to facilitate receiving a request 120 from the subscriber 110 to facilitate acquiring one or more prescribed sets of information 160 from one or more selected providers 150, i.e., internal 155 and/or external 155 sources, of information 150. In addition, the administrator 130 is configured to facilitate instructing the information acquisition engine 140 to facilitate receiving the information 160 from the selected providers 150 and to facilitate communicating the information 160 to an information assimilator 170. The information assimilator 170 is configured to facilitate receiving the information 160 from the information acquisition engine 140, to facilitate combining the information 160 into an information suite 176, and to facilitate storing the information suite 176 in a database 178. Finally, the administrator 130 may be configured to facilitate informing the subscriber 110 whether and when the requested information 160 has been collected and where and/or how it may be accessed. Optionally, the administrator 130 may be configured to facilitate communicating a request to the information assimilator 170 to facilitate transmitting the information suite 176 to a designated information recipient 180. In such embodiments, the information assimilator 170 is configured to facilitate communicating with the information recipient 180 so that the information suite 176 may be transmitted.

In accordance with an exemplary embodiment of the present invention, the request 120 from the subscriber 110 is configured to facilitate flexibly modifying the definition of the information 160 to be collected and/or the identity of the information provider. In accordance with another exemplary embodiment of the present invention, the information acquisition engine 140 may additionally be configured to facilitate acquiring information 160 from an internal database 178 to be combined with the external information 160 acquired by, or whose acquisition was facilitated by, the information assimilator 170. In accordance with yet another exemplary embodiment of the present invention, the information suite 176 may be configured to facilitate processing by the recipient 180 in order to determine the risk associated with a transaction.

In accordance with another aspect of the present invention, a method of handling information 160 is initiated when an administrator 130 facilitates receiving a request 120 from a subscriber 110 to acquire one or more prescribed sets of information 160 from one or more selected providers, i.e., internal and/or external sources, of information 160. In response to the request 120, the administrator 130 facilitates implementation of the identity of the information provider and the requested information 160 and facilitates communication of conforming instructions to an information acquisition engine 140. In accordance with those instructions, the information acquisition engine 140 facilitates receiving the requested information 160 from the selected provider and facilitates communicating the information 160 to an information assimilator 170. The information assimilator 170 facilitates receiving the information 160 from the information acquisition engine 140, facilitates combining the information 160 into an information suite 176, and facilitates storing the information suite 176 in a database 178. Finally, the administrator 130 facilitates informing the subscriber 110 whether and when the requested information 160 has been collected and where and how it may be accessed. Optionally, the system 100 facilitates transmission of the information suite 176 to a designated information recipient 180.

In accordance with an exemplary embodiment of the present invention, the definition of the information to be collected and/or the identity of the information provider are stored in a standard request module 120 for repetitive use. A standard request module 120 may facilitate modification by a subscriber 110 as information availabilities, requirements, and/or providers change. In accordance with another exemplary embodiment of the present invention, the information acquisition engine 140 may additionally facilitate acquiring information 165 from an internal database 178 to be combined with the external information 162 received by the information acquisition engine 140. In accordance with yet another exemplary embodiment of the present invention, the information suite 176 may facilitate processing by the recipient 180 or its delegate in order to determine the risk associated with a transaction.

In accordance with the present invention, a subscriber 110 may be a person, an entity, an organization, a company, a machine, a computer, software and/or hardware, and may communicate a request 120 for information through a telephone conversation, facsimile, scanner, character recognition software, Internet, a network, a computer, an electronic database 178, or forms submitted to the administrator 130. In accordance with the present invention, a recipient 180 may also be a person, an entity, an organization, a company, a machine, a computer, software and/or hardware, and may receive information 160 through a telephone conversation, facsimile, scanner, character recognition software, Internet, a network, a computer, an electronic database 178, or forms provided by the administrator 130. In an exemplary embodiment, the administrator 130 may collect information 165 from an internal database 178 such as a record database 178 for comparison to, and verification of, information 162 collected from external sources. In these situations, the record information source may be maintained for such comparison and verification purposes, and the information 162 from the external sources may be compared to the information of record from the record information source. In the event that the information supplied by the subscriber 110 in its request 120 is incomplete, the administrator 130 may collect the missing information from a database 178 of default requests 120.

The external data to be acquired from external providers may include, for example, credit information, address cleansing information, information indicators, credit information (e.g., data from credit bureaus, risk scores, trade line information, credit application information, open-to-buy and the like), data from merchant partners (e.g., frequent flier club data or other loyalty data or reward program data), data pertaining to credit risk, data for identifying potential fraud (e.g., death records, governmental records or other public records) and/or other information. Address cleansing refers to a process of conforming an address to a standard format, verifying that any abbreviations contained in the address comply with the standardized format, such as the United States Postal Service standards, and performing an address matching operation. In an exemplary embodiment, an address acquired from an external database is compared to a corresponding address acquired from the internal record database, which provides a corresponding identity. The internally acquired identity may then be compared to the externally acquired identity to determine if a match exists.

With reference to FIG. 1, an exemplary information handling system 100 includes an administrator 130, a subscriber 110 and an information acquisition engine 140. An administrator may be an employee or other mechanism for defining data sources and configuring the manner in which data will be retrieved by the system and configured for use by a subscriber. The administrator 130 is any person, entity, hardware and/or software which is configured to facilitate receiving an information acquisition request 120 from the subscriber 110 to acquire one or more prescribed sets of information 160 from one or more selected external provider 152 of external information 162 and/or one or more selected internal provider 155 of internal information 165. An information acquisition engine 140 is any mechanism through which acquisition of a specified set of data 160 may be facilitated based on a definition of one or more data providers 150 and one or more requested pieces of information 160. The information acquisition request 120 accordingly includes a set definition 122 identifying the subscriber's selection of the information to be acquired and a provider definition 124 identifying the subscriber's selection of the information providers 150, which may be external information providers 152 or internal information providers 155. In addition, the administrator 130 is configured to instruct the information acquisition engine 140 to retrieve the information 160 from the selected providers 150 and to communicate the information 160 to an information assimilator 170. The information assimilator 170 is configured to facilitate receiving the information 160 from the information acquisition engine 140, to combine the information 160 into an assimilated information suite 176, and to store the assimilated information suite 176 in a database 178. Finally, the administrator 130 may be configured to send a message 131 informing the subscriber 110 whether and when the requested information 160 has been collected and where and/or how it may be accessed. Optionally, the administrator 130 may be configured to communicate an information transmission request 182 to the information assimilator 170 to transmit the information suite 176 to a designated information recipient 180. In such embodiments, the information assimilator 170 is configured to communicate with the information recipient 180 to facilitate transmission of the information suite 176.

In accordance with an exemplary embodiment of the present invention, the information acquisition request 120 from the subscriber 110 is configured to facilitate flexibly modifying the set definition 122 that describes the information 160 to be collected and/or the provider definition 124 that specifies the identity of the information provider 150. In accordance with another exemplary embodiment of the present invention, the information acquisition engine 140 may additionally be configured for acquiring information 165 by communicating with an internal database through a permanent, semi-permanent, or even intermittent communication link. The acquired information 165 is to be combined with external information 162 also acquired by the information acquisition engine 140 by communicating with an external database. In accordance with yet another exemplary embodiment of the present invention, the information suite 176 may be configured to facilitate processing by the recipient 180 in order to determine the risk associated with a transaction 190, which may be communicated to the subscriber 110.

In an exemplary embodiment, a subscriber configured data suite 176 comprises external information 162 defined by a request 120 that includes the identity of the external information provider 152 as well as a name and a subscriber number. The subscriber number may be configured so that its possession by the subscriber implies permission to access the information 162 on the selected database 152. The subscriber number may also be configured to provide an identifier for billing purposes. In another exemplary embodiment, the request 120 may include a request identifier, a subscriber identifier, a request time stamp and a request type code, a process control number and/or any other information helpful in effectively communicating a request 120 to the system 100.

Exemplary external information providers 152 may include merchant partners; travel-related service providers such as hotels, rental car agencies, airlines and travel agencies; loan servicing organizations such as the National Student Loan Clearinghouse; credit bureaus such as Experian and Equifax; fraud databases such as the Experian National Fraud Database; authentication and verification sources such as the Experian authentication tool; business information databases such as Dunn & Bradstreet; public records from government sites; or other sources such as Lexis/Nexis. Additional external information providers 152 may include a global risk assessment system that is configured to track cardmembers or applicants for cards and to gauge the creditworthiness of those cardmembers or applicants. It should be noted that a global risk assessment system may be configured to communicate with the data handling system 100 to facilitate "closed loop" underwriting for customers, and also to facilitate cross-selling of pre-determined eligible products to those customers. This cross-selling may be further enabled by cooperating utilities or by pre-approved solicitation files that may be configured to provide access to some or all open and active offers for an issuer of credit and to optionally use the data handling system to provide insight on a prospect's credit trends. For example, a partner data file may be configured to provide loyalty data that may help to predict consumer spending, credit quality, and the like and may also be configured to facilitate an additional process or mechanism to facilitate address verification. Further, data sources such as traditional credit bureaus may be used to leverage existing corporate relationships to provide improved verification and distinction information, to proactively identify consumer request profile system relationships, and to provide a basis for re-engineering initiatives in the future. The data sources may also include a third party data provider who may be a delegate of a specific merchant partner, designated to provide partner data to the information handling system 100. Other sources might be financial institutions.

The information to be acquired 160 may include data for computing a credit applicant's creditworthiness as well as other data such as data from a national fraud database. The national fraud database may provide a service such as address scrubbing or address matching. Also, sources may provide non-credit data as well as credit data. Additional information 160 may include demographic information, spending habits, payment history, reliability or the like. Demographic information may include address and social security number. In addition, information may be provided such as relationship data. For example, where a specific merchant has an established relationship with a particular individual, the relationship may be described through acquired data such as frequency of use of the service, e.g., frequent flier history. Other pieces of information may include payment history, number of accounts open to other creditors, debt-to-credit ratio, whether they pay their bills on time, whether they are, or the extent to which they are, overextended in their credit, whether they are living at their current address or whether and to what extent they move frequently, and their spending histories. Finally, the data may include accumulated loyalty points and status, demographic information, pre-approved solicitations, student loan information, behavioral data, debit data, fraud data, and other data useful to identify fraudulent names and to decrease erroneous approval of fraud accounts, telephone number, company name, street address, city, state, zip, extended zip, which may improve verification, business and income information, property appraisal information, long and short-term probabilities, eligibility indicators, current balance and credit line, Fico score or other known or standardized credit score, number of trades, major derogatory count, product eligibility, partner status, tenure, miles accumulated, miles redeemed, and demographic information, estimated household income, best delivery address, previous address, consumer request profile system identifier, or membership enrollment. In general, the data may comprise any data that could be used to assess creditworthiness, to protect against fraud, to enable employment decisions, to make credit decisions, or to determine whether to rent, or under what terms to rent, a specific property to a particular party. Regardless of which data source 150 is chosen, however, the utility 100 is configured to rapidly introduce or facilitate use of the new data 160. For example, when the system is configured to acquire data from a new data source, e.g., a new communication link is established, the system facilitates establishment of the new data link in approximately four to six weeks, after which subscribers 110 may reliably access the data very quickly. Conventionally, the time requirement may be as long as eight months.

The system 100 may include one or more host server or other computing system including a processor for processing digital information, a memory coupled to the processor for storing digital information, an input digitizer coupled to the processor for inputting digital information, an application program stored in the memory and accessible by the processor for directing processing of digital information by the processor, a display coupled to the processor and memory for displaying information derived from digital information processed by the processor and a plurality of databases, the databases including client information, merchant information, financial institution information and/or like information that could be used in association with the present invention. As those skilled in the art will appreciate, each computing system will typically include an operating system (e.g., Windows NT, 95/98/2000, Linux, Solaris, etc.) as well as various conventional support software and drivers typically associated with computers. Computing systems can be in a home or business environment with access to a network. In an exemplary embodiment, access is through the Internet through a commercially-available web-browser software package. It should be noted that the components of system 100 may be implemented as discrete modules or may be distributed within or across the other components of the system 100 such that the functions of each of the components are distributed among, i.e., implemented within, the elements of the system 100.

Communication between the subscriber 110, the information recipient 180, the providers 150 and the system 100 may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computers may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The computing units may be connected with each other via an information communication network. The network may be a public network and assumed to be insecure and open to eavesdroppers. In an exemplary implementation, the network may be the internet. In this context, the computers may or may not be connected to the internet at all times. For instance, a computer of the subscriber 110 may employ a modem to occasionally connect to the internet, whereas the administrator 130 computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997).

The system 100 may be suitably coupled to network via information links. A variety of conventional communications media and protocols may be used for information links such as, for example, a connection to an Internet Service Provider (ISP) over the local loop as is typically used in connection with standard modem communication, cable modem, Dish networks, ISDN, Digital Subscriber Line (DSL), or various wireless communication methods. The system 100 might also reside within a local area network (LAN) which interfaces to network via a leased line (T1, D3, etc.). Such communication methods are well known in the art, and are covered in a variety of standard texts. See, e.g., GILBERT HELD, UNDERSTANDING INFORMATION COMMUNICATIONS (1996), hereby incorporated by reference.

In accordance with an exemplary embodiment, the recipient 180 may be configured to assess the risk associated with a transaction 190. Alternatively, the consuming application may be configured to perform other useful processes such as preparing a marketing offer, preparing a presentation, making a marketing decision, analyzing a potential customer or set of customers, transmitting specific information, organizing information, collecting and/or storing information.

It should be noted that the information 160 required to make a customer-focused credit decision 190 may exceed the information traditionally presented on a credit application. External information 162, however, such as credit bureau reports or strategic alliance partner data may permit a more comprehensive assessment of the transaction risk and/or creditworthiness of the applicant 190. With the emergence of e-commerce, numerous new providers 152 with trusted data may improve the accuracy of the assessment of risk associated with a transaction, which may depend upon an applicant's creditworthiness and validity 190. The instant invention enables a subscriber to leverage these new information sources so that they may be easily used within the consumer and small business credit evaluation process.

In an exemplary embodiment, an administrator 130 is configured to facilitate receiving and execute an information acquisition request 120. The means through which the request 120, or any other communication or messages, are transmitted may comprise enterprise messaging middleware, such as MQ messaging from IBM, or may comprise any other software suitable for sending messages. An exemplary message may comprise an information acquisition request 120, or a confirmation that the information was received. The system 100 may be configured to maintain the security and/or confidentiality of transmitted information through means such as encryption, application of appropriate legends, e.g., proprietary legends, and use of secure transmission means. Similarly, when communicating with an external information provider 152 or an internal information provider 155, the system 100 may use an enterprise messaging middleware, such as MQ messaging, or any other software suitable for sending messages.

In an exemplary embodiment, a plurality of remote protocols may be established to facilitate communication with a plurality of conforming data providers. In accordance with this embodiment, a remote protocol may be first established for a particular data provider, and that protocol may later be accessed to facilitate communication with any other data provider conforming to the standard protocol. As new providers arise, requiring the establishment of new protocols, and as corresponding new protocols are developed and saved, so as to add to the library of previously established protocols, the growing family of protocols may become available for use with other conforming data providers. In this way, time and resources that would otherwise be required to establish cooperation with particular new data providers may be reduced dramatically as previously configured remote protocols are made available for re-use and/or adaptation. For example, in accordance with one embodiment, a remote protocol may be configured for use with a specific language such as Extensible Markup Language or MQ messaging from IBM so that a predetermined set of information may be acquired from a conforming data provider. Then, when a new data provider becomes available and adopts the Extensible Markup Language protocol of the MQ messaging protocol, a new link may be quickly established for that new provider. Further, data elements may be defined and/or described through tags (e.g., metatags) so that a simple manipulation of the tag will enable a consistent modification of the data element wherever it is accessed. Accordingly, remote protocols are configured to accomplish most common or repetitive information acquisition requests 120 such as retrieving account registrations, account types, and/or a product types.

In addition, a database 178 may be used to store and maintain information 160. Database 178, as well as other databases used in conjunction with the invention, may be any type of database, such as relational, hierarchical, object-oriented, and/or the like. Database 178 may be configured to be periodically purged to eliminate stale data and to reduce database size requirements. For example, data currency may be maintained by periodic purging of the entire database every 30 or 60 days or may be accomplished with respect to only specific data elements once those data elements become 30 or 60 days old. Other data purging or data retention practices may be implemented to comply with governmental laws, industry standards, and/or organizational policies. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as information tables or lookup tables. Association of certain information may be accomplished through any information association technique known and practiced in the art. For example, the association may be accomplished either manually or automatically. Automatic association techniques may include, for example, an database search, an database merge, GREP, AGREP, SQL, and/or the like. The association step may be accomplished by a database merge function, for example, using a "key field" in each of the manufacturer and retailer information tables. A "key field" partitions the database according to the high-level class of objects defined by the key field. For example, a certain class may be designated as a key field in both the first information table and the second information table, and the two information tables may then be merged on the basis of the class information in the key field. In this embodiment, the information corresponding to the key field in each of the merged information tables is preferably the same. However, information tables having similar, though not identical, information in the key fields may also be merged by using AGREP, for example.

Figure 2:
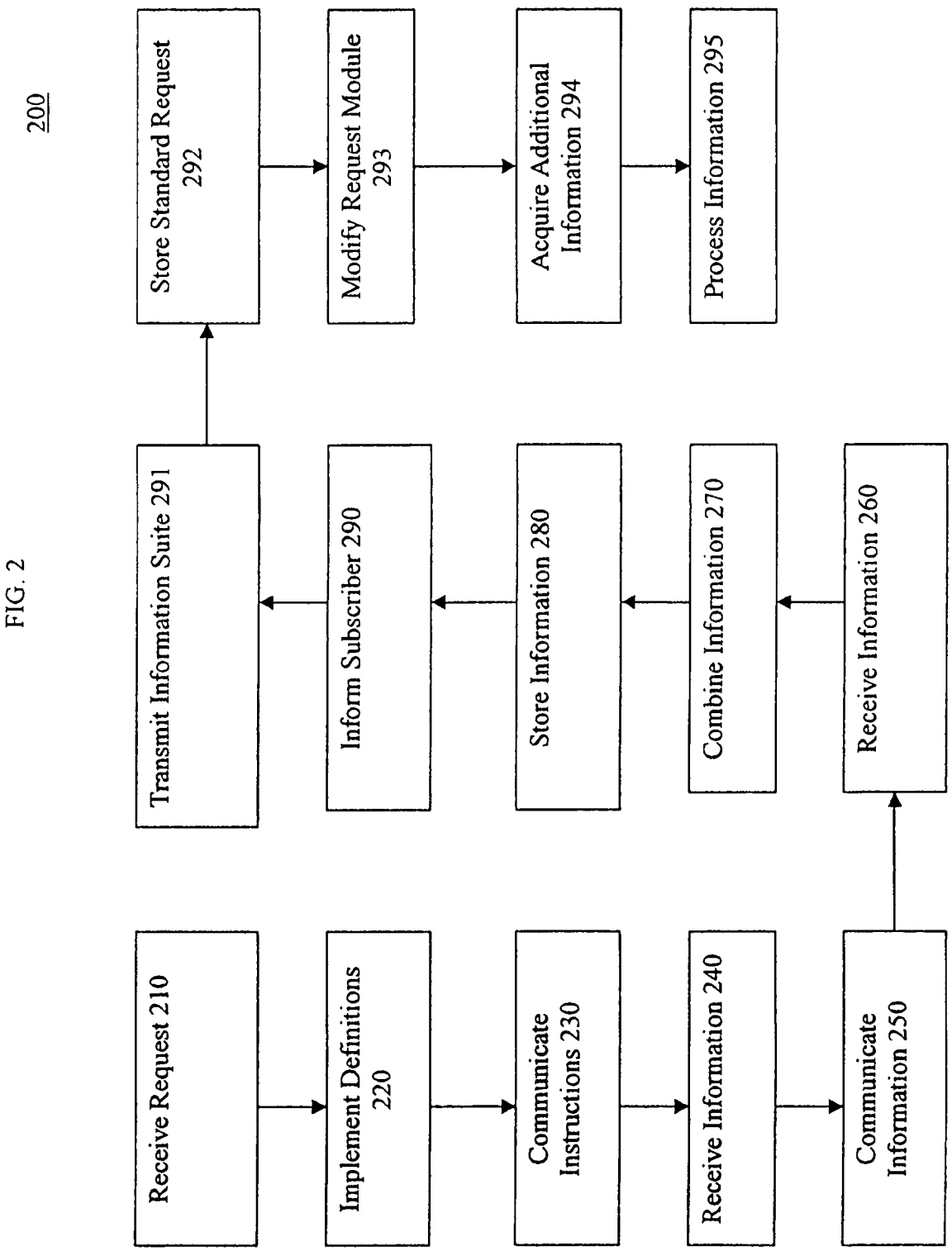

With reference to FIG. 2, in accordance with a further aspect of the present invention, a method of handling information (method 200) is initiated when an administrator 130 receives an information acquisition request 120 from a subscriber 110 to acquire one or more prescribed sets of information 160 from one or more selected providers 150, i.e., internal and/or external sources, of information 160 (step 210). In response to the information acquisition request 120, the administrator 130 implements the provider definition 124, which defines the identity of the information provider 150, and the set definition 122, which defines the requested information 160, into a conforming set of instructions for the information acquisition engine 140 (step 220). The administrator 130 then communicates the conforming instructions to an information acquisition engine 140 (step 230). In accordance with those instructions, the information acquisition engine 140 retrieves the requested information 160 from the selected provider 150 (step 240) by communicating across an established communication link using an agreed upon communication protocol. It should be noted that the selected provider may accumulate information as a byproduct of its business, e.g., a merchant's collecting data regarding a specific loyal consumer, or may be in the business of collecting data, e.g., a credit bureau in regular communication with a network of credit issuers. Upon receipt of the requested data, the acquisition engine 140 then communicates the information 160 to an information assimilator 170 (step 250). The information assimilator 170 receives the information from the information acquisition engine 140 (step 260), combines the information into an information suite 176 (step 270), and stores the information suite 176 in a database 178 (step 280). It should be noted that in an exemplary embodiment, an information suite 176 is a composite of data elements having their origin in a plurality of data sources. Each of the data elements bears a structure comprising a plurality of data fields, and each of the fields serves to describe an attribute of the data element. For example, a first data field may be configured to describe a value, another data field may be configured to describe the format of the first data element (e.g., numeric or alpha-numeric), another data field may be configured to describe the original source of the data element, and additional data fields may be configured to describe additional attributes of the data element such as its acquisition date, its units, its description, and the like. Finally, the administrator 130 informs the subscriber 110 whether and when the requested information 160 has been collected and where and how it may be accessed (step 290). In an exemplary embodiment, this may be accomplished by defining a tag or other unique identifier that is configured to enable the subscriber 110, through a known and established communication link, and using a known protocol, to view and use the acquired information. Optionally, the information suite 176 is transmitted by the system 100 directly to a designated information recipient 180 (step 291).

In accordance with an exemplary embodiment of the present invention, the set definition 122, which defines the information 160 to be collected and/or the identity of the information provider 150, are stored in a standard request module 120 for repetitive use (step 292). It should be noted that set definition 122 may define the information to be acquired and the source of the information 160 through any format or notation or other means known in the art so long as the information acquisition information engine is able to interpret the set definition 122 to uniquely identify the information and the provider. For example, a provider may be identified by a unique number or set of alpha-numeric characters, and a set of information may be defined by a single set of characters forming one data element or by a plurality of characters serving to uniquely identify the information set. A request module 120 may be modified by a subscriber 110 as information requirements or providers change (step 293). In accordance with another exemplary embodiment of the present invention, the information acquisition engine 140 may additionally acquire internal information 165 from an internal database 155 to be combined with the external information 162 acquired by the information acquisition engine 140 (step 294). In accordance with yet another exemplary embodiment of the present invention, the information suite 176 may be processed by the recipient 180 in order to determine the risk associated with a transaction 190 (step 295), which risk assessment may be communicated to the subscriber 110.

Accordingly, the invention provides an improved system and method for facilitating the collection, storage and distribution of information, where the provider definition 124 may be easily configured by a subscriber 110. Moreover, the invention provides a system and method for facilitating the collection, storage and distribution of information, where the set definition 122 may be easily configured by a subscriber 110. It should be noted that the system of the instant invention may be configured to facilitate collection of many useful sets of information or to make many varied and useful determinations. Thus, it should not be construed as being limited to use in determining the transaction risk, which may depend upon the creditworthiness of a potential creditor. For example, a credit issuer may employ the present invention to assess an overall composite risk associated with a particular transaction or series of transactions where the overall risk comprises risk contributions from many sources. For example, a composite risk may involve a risk of creditor fraud, a risk of creditor default, a risk of merchant fraud, a risk of insured loss, a risk of slow payment, a risk of economic uncertainty, a risk associated with a consumer, the consumer's creditworthiness, the risk of error, and other related and relevant contributory risks. An exemplary system may be configured to facilitate an assessment of individual risk elements and to combine the individual risk elements into a composite risk assessment using any known method such as the root sum squared method or probabilistic methods such as Monte Carlo methods.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of information structures, objects, processes, routines or other programming elements. Further, it should be noted that the present invention may employ any number of conventional techniques for information transmission, signaling, information processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference for background purposes.

It will be appreciated, that many applications of the present invention could be formulated. One skilled in the art will appreciate that the network may include any system for exchanging information or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

It should be appreciated that the particular implementations shown and described herein are illustrative of the invention and its best mode and are not intended to otherwise limit the scope of the present invention in any way. Indeed, for the sake of brevity, conventional information networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, an information processing system, a device for information processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable information processing apparatus to produce a machine, such that the instructions which execute on the computer or other programmable information processing apparatus create means for implementing the functions specified in the flowchart block or blocks.

These computer program instructions may also be stored in a computer-readable memory that can direct a computer or other programmable information processing apparatus to function in a particular manner, such that the instructions stored in the computer-readable memory produce an article of manufacture including instruction means which implement the function specified in the flowchart block or blocks. The computer program instructions may also be loaded onto a computer or other programmable information processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. It will be appreciated, however, that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. An improved system for facilitating collection, storage and distribution of information comprising:
a payment processor administrator configured to facilitate receiving from a subscriber an information acquisition request defining a selection parameter and a provider definition encoded within said information acquisition request, said payment processor administrator further configured to retrieve at least one of said selection parameter and said provider definition from payment processor parameter information, when said at least one of said selection parameter and said provider definition is not included in said information acquisition request, wherein said payment processor parameter information is derived from a payment processor;
a payment processor information assimilator configured to facilitate receiving information from an information acquisition engine, wherein said information acquisition engine retrieves said information from an information provider and, wherein said information is compared to corresponding payment processor internal information to verify the accuracy of said information if said corresponding payment processor internal information exists;
said information assimilator configured to combine said information into an information suite, wherein said information suite is configured to facilitate processing by a recipient to determine a risk associated with a transaction,
wherein said subscriber is configured to initiate a mitigation action responsive to said risk.

2. The system of claim 1, wherein said information provider is an external provider.

3. The system of claim 1, wherein said information provider is an internal provider.

4. The system of claim 1, wherein said payment processor administrator is configured to facilitate informing said subscriber about said collection of said information.

5. The system of claim 1, wherein said payment processor administrator is configured to facilitate instructing said subscriber regarding access to said information.

6. The system of claim 1, wherein said payment processor information assimilator is configured to facilitate transmitting said information suite to a designated information recipient.

7. The system of claim 6, wherein said payment processor administrator is configured to request said payment processor information assimilator to transmit said information suite to said designated information recipient.

8. An improved method for facilitating an assessment of risk associated with a transaction comprising:
receiving, at an information processing machine, an information acquisition request from a subscriber defining a selection parameter and an information provider definition encoded within said information acquisition request, wherein said information provider is at Least one of an internal information provider and an external information provider, wherein said information processing machine comprises a processor, a memory, and data store;
retrieving, using said information processing machine, at least one of said selection parameter and said information provider definition from payment processor internal parameter information, when said at least one of said selection parameter and said information provider definition is not included in said information acquisition request, wherein said payment processor internal parameter information is derived from a payment processor;
retrieving information, using said information processing machine, from said information provider based on said information acquisition request;
comparing, using said information processing machine, said information to corresponding internal information to verify the accuracy of said information if said corresponding internal information exists;
integrating said information, using said information processing machine, to form an information suite;
assessing, using said information processing machine, risk associated with said transaction using said information suite, and
initiating, by said subscriber, a mitigation action responsive to said risk.

9. The method of claim 8, further comprising communicating, using said information processing machine, said risk associated with said transaction to said subscriber.

10. A tangible computer readable medium having stored thereon, computer executable instructions that, if executed by a computing device, cause said computing device to perform a method for facilitating an assessment of risk associated with a transaction comprising:
receiving, at an information processing machine, an information acquisition request from a subscriber defining a selection parameter and an information provider definition encoded within said information acquisition request, wherein said information provider is at least one of an internal information provider and an external information provider, wherein said information processing machine comprises a processor, a memory, and data store;
retrieving, using said information processing machine, at least one of said selection parameter and said information provider definition from payment processor internal parameter information, when said at least one of said selection parameter and said information provider definition is not included in said information acquisition request, wherein said payment processor internal parameter information is derived from a payment processor;
retrieving information, using said information processing machine, from said information provider based on said information acquisition request;
comparing, using said information processing machine, said information to corresponding internal information to verify the accuracy of said information if said corresponding internal information exists;
integrating said information, using said information processing machine, to form an information suite;
assessing, using said information processing machine, risk associated with said transaction using said information suite, and
initiating, by said subscriber, a mitigation action responsive to said risk.

11. The tangible computer readable medium of claim 10, wherein said information provider is an external provider.

12. The tangible computer readable medium of claim 10, wherein said information provider is an internal provider.

13. The tangible computer readable medium of claim 10, wherein said payment processor administrator is configured to facilitate informing said subscriber about said collection of said information.

14. The tangible computer readable medium of claim 10, wherein said payment processor administrator is configured to facilitate instructing said subscriber regarding access to said information.

15. The tangible computer readable medium of claim 10, wherein said payment processor information assimilator is configured to facilitate transmitting said information suite to a designated information recipient.

16. The tangible computer readable medium of claim 10, wherein said payment processor administrator is configured to request said payment processor information assimilator to transmit said information suite to said designated information recipient.

* * * * *